United States Patent [19]

Mabuchi et al.

[11] Patent Number: 4,708,894
[45] Date of Patent: Nov. 24, 1987

[54] ORNAMENTAL AND PROTECTIVE MOLDING

[75] Inventors: Akira Mabuchi; Shinji Jinushi, both of Aichi, Japan

[73] Assignee: Toyoda Gosei Co., Ltd., Nishi Kasugai, Japan

[21] Appl. No.: 897,354

[22] Filed: Aug. 18, 1986

[30] Foreign Application Priority Data

Aug. 29, 1985 [JP] Japan .................................. 60-190529

[51] Int. Cl.$^4$ .............................................. B60R 13/04
[52] U.S. Cl. ..................................... 428/31; 52/716; 293/128
[58] Field of Search ........................... 428/31; 52/716; 293/128

[56] References Cited

U.S. PATENT DOCUMENTS

| 4,101,704 | 7/1978 | Hiles | 428/31 X |
| 4,349,592 | 9/1982 | Nussbaum | 428/31 |
| 4,446,179 | 5/1984 | Waugh | 428/31 |
| 4,546,021 | 10/1985 | Mears | 52/716 X |
| 4,560,596 | 12/1985 | Coscia | 293/128 X |
| 4,566,929 | 1/1986 | Waugh | 428/31 X |

Primary Examiner—Henry F. Epstein
Attorney, Agent, or Firm—Cushman, Darby & Cushman

[57] ABSTRACT

The ornamental and protective molding is described, comprising a belt-shaped support of a synthetic resin of which is coated with a transparent synthetic resin layer having a positive meniscus, said transparent synthetic resin layer comprises a cured polyurethane that is the reactive product of a polyether polyol component and an aliphatic polyisocyanate component, wherein the polyether polyol component comprising diols that are alkylene oxide adducts of bisphenol A and have a number average molecular weight of 3,000 or less is used singly or in combination.

2 Claims, 1 Drawing Figure

U.S. Patent    Nov. 24, 1987    4,708,894
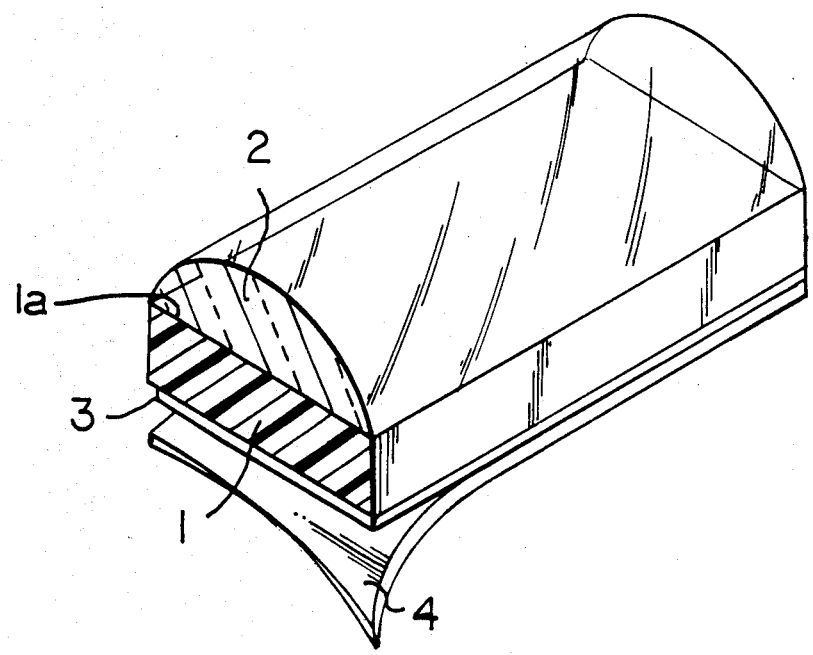

ORNAMENTAL AND PROTECTIVE MOLDING

FIELD OF THE INVENTION

The present invention relates to an ornamental and protective molding of the structure wherein the surface of a belt-shaped support made of a synthetic resin is coated with a transparent synthetic resin layer having a positive meniscus. Particularly, the present invention relates to an ornamental and protective molding that is suitable for use as automotive parts such as a side molding, bumper molding, rocker molding or an interior garnish strip.

BACKGROUND OF THE INVENTION

A typical example of the conventional ornamental and protective molding as described above (hereinafter referred to simply as a "molding") is shown in the FIGURE, and is manufactured by a method generally referred to as potting, wherein a belt-shaped support 1 is first made of a synthetic resin with both lateral sides formed in an edge shape, and onto the top surface of the support 1a, a liquid transparent synthetic resin material with an appropriate viscosity is poured and cured to form a transparent synthetic resin layer 2 having a positive meniscus. This method is described in U.S. Pat. Nos. 4,446,179 and 4,566,929. According to this prior art reference, the transparent synthetic resin layer 2 is preferably made of a cured polyurethane that is the reaction product of a polyether polyol component (polypropylene glycol) and an aliphatic diisocyanate, for a molding having a desired resistance to both wear and shock; alternatively, the layer 2 is preferably made of a cured polyurethane that is the reaction product of (1) a mixture of a polyester glycol and a polypropylene triol of low to medium molecular weight and (2) an aliphatic diisocyanate/polypropylene triol adduct, for a desired flexible molding. In the FIGURE, the numeral 3 indicates a double-side adhesive tape, and 4 is a release paper.

The present inventors prepared samples of moldings wherein the transparent synthetic resin layer 2 was made of the two types of cured polyurethane and conducted various performance tests on these samples. As a result, the moldings were found to have the following defects.

(a) When the transparent synthetic resin layer was made of the cured polyurethane that was the reaction product of a polyether polyol component and an aliphatic diisocyanate component, the molding used as a side molding tended to generate cracking on the synthetic resin layer or peeling of the layer and the belt-shaped support because the molding was bent by a large curvature so that it would fit curved corners of the body of a vehicle.

(b) When the transparent synthetic resin layer was made of the cured polyurethane that was the reaction product of (1) a mixture of a polyester glycol and a polypropylene triol of low to medium molecular weight and (2) an aliphatic diisocyanate/polypropylene triol adduct, the above problems were partly resolved, but on the other hand, the resulting resin layer did not have a high degree of transparency since the polyol component was of a multi-component system having different molecular weights. Therefore, the second approach is not suitable for the case where a synthetic resin layer having a lens effect is desired.

In order to resolve these problems, the present inventors previously proposed that a tetraol which is an alkylene oxide adduct of ethylenediamine having a number average molecular weight of 1100 or less should be used as the polyol component of the cured polyurethane of which the transparent synthetic resin layer 2 is made.

When a molding in which the transparent synthetic resin layer 2 was made of a cured polyurethane using the above-specified tetraol as the polyol component was bent in a heated atmosphere (usually at about 70° C.), the resin layer 2 could withstand bending by an appreciably large curvature (usually up to 1/20 cm$^{-1}$) without occurring any cracking in the resin layer 2. However, with the recent trend toward more versatile design in the body of an automotive vehicle, the need for bending the molding by an even greater curvature (usually 1/15 cm$^{-1}$) is increasing, and the resin layer 2 has been proved to be incapable of sufficiently withstanding bending under such severe conditions without generating any cracking.

SUMMARY OF THE INVENTION

The object, therefore, of the present invention is to provide an ornamental and protective molding that is capable of satisfactorily withstanding bending by a very large curvature without generating any cracking or other flaws in the transparent synthetic resin layer.

The molding of the present invention comprises a belt-shaped support of a synthetic resin of which is coated with a transparent synthetic resin layer having a positive meniscus, said transparent synthetic resin layer comprises a cured polyurethane that is the reaction product of a polyether polyol component and an aliphatic polyisocyanate component. In order to attain the above object, the present inventors have found to use singly or in combination a diol that is an alkylene oxide polyadduct of bisphenol A and has a number average molecular weight of 3,000 or less, as the polyether polyol component.

BRIEF DESCRIPTION OF THE DRAWING

The FIGURE is a perspective view showing the basic construction of a molding.

DETAILED DESCRIPTION OF THE INVENTION

The components of the molding of the present invention are hereunder described in detail with reference to the FIGURE.

(1) The belt-shaped support 1 is made of an extrusion- or injection-molded synthetic resin material having excellent heat and shock resistance, such as an acrylonitrile/butadiene/styrene terpolymer (ABS), polyvinyl chloride (PVC), nylon (polyamide), polycarbonate, an acrylonitrile/styrene copolymer (AS) or an ionomer. Of these, preferred synthetic resin material is polyvinyl chloride (PVC).

(2) The transparent synthetic resin layer 2 is formed by potting on the surface of the belt-shaped support 1 the polyurethane material described above after it has been thoroughly defoamed under reduced pressure. Before potting, a catalyst based on a heavy metal compound or an amine which is commonly employed in the curing of polyurethane is added to the polyurethane material. If desired, an antioxidant or an ultraviolet absorber (for stabilizing the quality of the product polyurethane over a long period) or a surfactant (for the purpose of providing improved levelling properties or shortening the period of defoaming) can also be added. Needless to say, any of the chemical agents that are added to the polyurethane material should be such that they will not impair the transparency of the cured polyurethane.

Examples of the above catalyst based on a heavy metal compound include tin (II) chloride, tin (IV) chloride, tetra-n-tin butylate, tri-n-buty tin acetate, and dibutyl tin dilaurate.

Examples of the above catalyst based on an amine include triethylamine, triethylenediamine, hexamethylenetetramine, N-methylmorpholine, N,N-dimethylbenzylamine, and N,N,N'N'-tetramethylethylenediamine.

The diol which is an alkylene oxide polyadduct of bisphenol A has a number average molecular weight of generally 3,000 or less, and preferably 360 to 2,000. If the number average molecular weight of the diol exceeds 3,000, the density of each of the aromatic nuclei in the main chain is decreased and the heat resistance and strength of the cured polyurethane are decreased. The number average molecular weight of 360 is the lowest molecular weight that is obtained by attaching 1 mol of propylene oxide to both sides of bisphenol A. It is preferable that two types of diols, e.g., one having a low molecular weight and the other having a medium to high molecular weight, are used in combination. Propylene oxide is generally used as a chain-extending alkylene oxide in view of water resistance, transparency and the like, and ethylene oxide is generally used as a terminal blocking alkylene oxide in view of reactivity and the like. If all of the alkylene oxides used are ethylene oxide, the reaction system easily gels and the resulting cured product of polyurethane cannot obtain a satisfactory water resistance.

The aliphatic isocyanate which can be used for the cured polyurethane of the present invention can be an originally aliphatic or an alicyclic isocyanate. Examples of the isocyanates include non-yellowing isocyanates such as hexamethylene diisocyanate (HMDI), xylene diisocyanate (XDI), hydrogenated xylene diisocyanate (hydrogenated XDI), 4,4'-methylene bisdicyclohexyldiisocyanate (H12MDI), methylcyclohexyl diisocyanate (hydrogenated TDI) and isophorone diisocyanate (IPDI). In order to obtain easy handling, these isocyanates are generally used after being rendered poorly volatile in the form of either a polyol (e.g., triol) adduct or a polymer. Of these, prepolymer of hexamethylene diisocyanate (HMDI) or isophorone diisocyanate (IPDI) is preferably used. The mixing ratio by equivalent of the polyol/isocyanate components are generally set at $1/1 \geq$ polyol component/isocyanate component (OH/NCO) $\geq 1/1.3$.

EXAMPLE

Each of the polyol components shown in Table 1 and an isocyanate component (a diol adduct of hexamethylene diisocyanate; NCO, 20% ) were individually defoamed under reduced pressure (5 mm Hg) for 1 hour at 50° C. They were then mixed at an NCO/OH ratio (equivalent ratio) which was approximately 1/1. The mixture was defoamed again under reduced pressure (5 mm Hg) for 5 minutes at 50° C. The defoamed mixture was dropped onto a PVC belt-shaped support (rectangular in cross section; 37 mm wide and 10 mm high) preheated to 70° C. to form a coating sample having an amount of 0.2 g/cm$^2$. The support was held in a heated atmosphere (at 80° C.) for 60 minutes to produce a molding with a cured polyurethane coat on the PVC support. With different polyol components being used, molding samples of the present invention and comparative samples were prepared. The samples according to the present invention all had a satisfactory transparency.

Test pieces were prepared from the same polyurethane material and subjected to the following tests.

(1) Testing physical properties in normal state (i) tensile strength (JIS K6301)
(ii) elongation (JIS K6301)
(iii) tear strength (JIS K6301)
(iv) hardness (ASTM D785)

(2) Creep test

A test piece (Dumbbell No. 3 in accordance with JIS) was held in a heated atmosphere (70° C.) while it was stretched by 20%. 30 Minutes later, the test piece was checked for any occurrence of rupture. The creep test was conducted in order to estimate the flexing resistance of the transparent synthetic resin layer in view of the fact that the surface thereof would experience an elongation of about 20% when a molding was bent by a curvature of 1/15 cm$^{-1}$.

The results of all the tests conducted are shown in Tables 2 and 3.

TABLE 1

| Types of Polyol | Monomer | Mn | OH Value |
|---|---|---|---|
| Ethylenediamine | Propylene Oxide/ Ethylenediamine | 450 | 500 |
| Sorbitol | Propylene Oxide/ Sorbitol | 600 | 550 |
| Glycerin | Propylene Oxide/ Glycerin | 300 | 520 |
| Bisphenol (I) | Propylene Oxide/ Ethylene Oxide/ Bisphenol A | 360 | 312 |
| Trimethylolpropane | Propylene Oxide/ Trimethylolpropane | 400 | 400 |
| Bisphenol (II) | Propylene Oxide/ Ethylene Oxide/ Bisphenol A | 500 | 224 |
| Bisphenol (III) | Propylene Oxide/ Ethylene Oxide/ Bisphenol A | 800 | 140 |
| Bisphenol (IV) | Propylene Oxide/ Ethylene Oxide/ Bisphenol A | 1,200 | 93.5 |
| Bisphenol (V) | Propylene Oxide/ Ethylene Oxide/ Bisphenol A | 1,500 | 74.8 |
| Bisphenol (VI) | Propylene Oxide/ Ethylene Oxide/ Bisphenol A | 2,000 | 56.1 |

TABLE 2

| Example No. | Bisphenol-Based Polyol | Physical Properties in Normal State | | | | Creep Test |
|---|---|---|---|---|---|---|
| | | Tensile Strength (kg/cm$^2$) | Elongation (%) | Tear Strength (kg/cm) | Hardness (D) | |
| 1 | (I) alone | 563 | 10 | 111 | 77 | Not ruptured |
| 2 | (II) alone | 98 | 430 | 20 | 22 | " |
| 3 | (III) alone | 9 | 270 | 6 | 11 | " |

TABLE 2-continued

| Example No. | Bisphenol-Based Polyol | Tensile Strength (kg/cm²) | Elongation (%) | Tear Strength (kg/cm) | Hardness (D) | Creep Test |
|---|---|---|---|---|---|---|
| 4 | (I)/(II) mixture, ratio: 3/1 | 589 | 20 | 88 | 82 | " |
| 5 | (I)/(II) mixture, ratio: 1/1 | 247 | 270 | 143 | 74 | " |
| 6 | (I)/(II) mixture, ratio: 1/3 | 319 | 320 | 60 | 64 | " |
| 7 | (I)/(III) mixture, ratio: 3/1 | 534 | 10 | 83 | 78 | " |
| 8 | (I)/(III) mixture, ratio: 1/1 | 262 | 350 | 57 | 64 | " |
| 9 | (I)/(III) mixture, ratio: 1/3 | 17 | 310 | 9 | 24 | " |
| 10 | (I)/(IV) mixture, ratio: 1/1 | 89 | 400 | 18 | 43 | " |
| 11 | (I)/(V) mixture, ratio: 1/1 | 86 | 320 | 21 | 20 | " |
| 12 | (I)/(VI) mixture, ratio: 1/1 | 109 | 440 | 16 | 30 | " |

TABLE 3

| Comparative Example No. | Polyol Component | Tensile Strength (kg/cm²) | Elongation (%) | Tear Strength (kg/cm) | Hardness (D) | Creep Test |
|---|---|---|---|---|---|---|
| 1 | Ethylenediamine-based | 207 | 120 | 94 | 64 | Ruptured in 30 min |
| 2 | Sorbitol-based | 553 | 10 | 156 | 60 | Ruptured in 30 min |
| 3 | Glycerin-based | 149 | 140 | 40 | 49 | Ruptured in 30 min |
| 4 | Trimethylolpropane-based | 70 | 110 | 14 | 48 | Ruptured in 30 min |

As the result of Table 2, the cured polyurethane products for the transparent synthetic resin layers in the molding samples of the present invention exhibited an excellent creep resistance and this proves that the transparent synthetic resin layers in the molding samples of the present invention would be capable of satisfactorily withstanding bending by a very large curvature. On the other hand, as the result of Table 3, the cured polyurethane products for the transparent synthetic resin layers in the comparative molding samples exhibited only a poor creep resistance and this proves that the transparent synthetic resin layers in the comparative molding samples would not be capable of withstanding bending by a very large curvature.

The molding of the present invention is characterized in that a diol that is an alkylene oxide polyadduct of bisphenol A and has a number average molecular weight of 3,000 or less is used as the polyol component of the polyurethane of which the transparent synthetic resin layer is made. Because of using this specific type of polyol component, the molding of the present invention can be bent by a large curvature without generating any crack on the transparent synthetic resin layer or peeling of the resin layer and the belt-shaped support. This present a great advantage when the molding is installed on the body of a vehicle with a curved corner or any other portion having a large curvature.

While the invention has been described in detail and with reference to specific embodiments thereof, it will be apparent to one skilled in the art that various changes and modifications can be made therein without departing from the spirit and scope thereof.

What is claimed is:

1. An ornamental and protective molding comprising a belt-shaped support of a synthetic resin of which is coated with a transparent synthetic resin layer having a positive meniscus, said transparent synthetic resin layer comprises a cured polyurethane that is the reactive product of a polyether polyol component and an aliphatic polyisocyanate component, wherein the polyether polyol component comprising diols that are alkylene oxide adducts of bisphenol A and have a number average molecular weight of 3,000 or less is used singly or in combination.

2. An ornamental and protective molding as claimed in claim 1, wherein the number average molecular weight is 360 to 2,000.

* * * * *